(12) United States Patent
Li

(10) Patent No.: US 11,531,594 B2
(45) Date of Patent: Dec. 20, 2022

(54) DATA RECOVERY METHOD AND APPARATUS, SERVER, AND COMPUTER-READABLE STORAGE MEDIUM

(71) Applicant: Tencent Technology (Shenzhen) Company Limited, Guangdong (CN)

(72) Inventor: Haixiang Li, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 79 days.

(21) Appl. No.: 17/175,139

(22) Filed: Feb. 12, 2021

(65) Prior Publication Data
US 2021/0165716 A1 Jun. 3, 2021

Related U.S. Application Data

(63) Continuation of application No. PCT/CN2019/121916, filed on Nov. 29, 2019.

(30) Foreign Application Priority Data

Nov. 30, 2018 (CN) .......................... 201811457196.1

(51) Int. Cl.
G06F 16/21 (2019.01)
G06F 11/14 (2006.01)

(52) U.S. Cl.
CPC ...... *G06F 11/1448* (2013.01); *G06F 11/1469* (2013.01)

(58) Field of Classification Search
CPC ........ G06F 16/21; G06F 1/206; G06F 1/3206; G06F 11/1448; G06F 11/1469;
(Continued)

(56) References Cited

U.S. PATENT DOCUMENTS 6,938,180 B1* 8/2005 Dysert ................ G06F 11/1458
714/E11.122
8,099,572 B1* 1/2012 Arora ...................... G06F 13/28
711/E12.013
(Continued)

FOREIGN PATENT DOCUMENTS

CN 103942117 A 7/2014
CN 107179965 A 9/2017
(Continued)

OTHER PUBLICATIONS

International Search Report Issued in Application PCT/CN2019/121916 dated Feb. 26, 2020 with English translation, (6 pages).
(Continued)

*Primary Examiner* — Apu M Mofiz
*Assistant Examiner* — Cindy Nguyen
(74) *Attorney, Agent, or Firm* — ArentFox Schiff LLP

(57) ABSTRACT

A data recovery method is provided. In the method, a backup type of a backup data packet is identified. Data recovery is performed based on physically backed up data in the backup data packet in a case that the identified backup type is a hybrid backup, the hybrid backup being a backup process that includes a physical backup and a logical backup. Data recovery is performed on logically backed up data in the backup data packet after the data recovery based on the physically backed up data is completed.

20 Claims, 4 Drawing Sheets

(58) Field of Classification Search
CPC ............ G06F 2201/80; G06F 11/1474; G06F 16/219; G06F 16/27; G05B 19/406; G05B 2219/50333; H05K 7/20836; H05K 7/1498

See application file for complete search history.

(56) References Cited

U.S. PATENT DOCUMENTS

| | | | |
|---|---|---|---|
| 8,990,161 | B1 | 3/2015 | Singhal et al. |
| 9,183,205 | B1 * | 11/2015 | Kume .................. G06F 16/113 |
| 9,424,265 | B1 | 8/2016 | Sui et al. |
| 2013/0268493 | A1 | 10/2013 | Berman et al. |

FOREIGN PATENT DOCUMENTS

| | | |
|---|---|---|
| CN | 104657382 B | 9/2018 |
| CN | 110196758 A | 9/2019 |
| CN | 110209527 A | 9/2019 |
| CN | 110209528 A | 9/2019 |
| CN | 110309122 A | 10/2019 |
| CN | 110309233 A | 10/2019 |
| JP | 2004139217 A | 5/2004 |
| JP | 2006092553 A | 4/2006 |
| JP | 2006106868 A | 4/2006 |
| JP | 2011053780 A | 3/2011 |
| JP | 2014137711 A | 7/2014 |
| WO | WO 2018/049903 A1 | 3/2018 |

OTHER PUBLICATIONS

Written Opinion Issued in Application PCT/CN2019/121916 dated Feb. 26, 2020 (4 pages).

Japanese Office Action dated Mar. 22, 2022 in Application No. 2021-506468 with English Translation.

European Partial Search Report dated Dec. 17, 2021 in European Application No. 19889862.9, 14 pgs.

* cited by examiner

DATA RECOVERY METHOD AND APPARATUS, SERVER, AND COMPUTER-READABLE STORAGE MEDIUM

RELATED APPLICATION

This application is a continuation of International Application No. PCT/CN2019/121916, filed on Nov. 29, 2019, which claims priority to Chinese Patent Application No. 201811457196.1, filed on Nov. 30, 2018, and entitled "DATA RECOVERY METHOD AND APPARATUS, SERVER, AND COMPUTER-READABLE STORAGE MEDIUM." The entire disclosures of the prior applications are hereby incorporated by reference in their entirety.

FIELD OF THE TECHNOLOGY

This application relates to the field of database technologies, including to a data recovery method and apparatus, a server, and a non-transitory computer-readable storage medium.

BACKGROUND OF THE DISCLOSURE

In data processing systems, especially in scenarios such as online analytical processing (OLAP) processing systems, data warehouses, and big data analysis, storage of mass of data in a database is involved. Since services may be continuously updated, one data item logically includes version data corresponding to a plurality of states. In this way, full-state (current-state, transition-state and historical-state) data of one data item is saved, making it convenient for a system to track historical-state data and thoroughly mine the value of data (any data is valuable, and no historical state data can be discarded). However, for a database, a recovery process based on backup data may also be involved. For backup data including the data of the plurality of states, the relationship between the data is complicated. Therefore, how to recover the full-state data can be a challenge.

SUMMARY

According to embodiments of this application, a data recovery method and apparatus, a server, and a non-transitory computer-readable storage medium are provided.

A data recovery method is provided. In the method, a backup type of a backup data packet is identified. Data recovery is performed based on physically backed up data in the backup data packet in a case that the identified backup type is a hybrid backup, the hybrid backup being a backup process that includes a physical backup and a logical backup. Data recovery is performed on logically backed up data in the backup data packet after the data recovery based on the physically backed up data is completed.

Optionally, the identifying a backup type of a backup data packet includes obtaining the backup type corresponding to a file name according to the file name in the backup data packet; or obtaining the backup type corresponding to a type identifier according to the type identifier carried in the backup data packet.

A data recovery apparatus including processing circuitry is provided. The processing circuitry is configured to identify a backup type of a backup data packet. The processing circuitry is configured to perform data recovery based on physically backed up data in the backup data packet in a case that the identified backup type is a hybrid backup, the hybrid backup being a backup process that includes a physical backup and a logical backup. The processing circuitry is further configured to perform data recovery on logically backed up data in the backup data packet after the data recovery based on the physically backed up data is completed.

A server is provided, including a processor and a memory, the memory storing at least one instruction, and the at least one instruction being loaded and executed by the processor to implement operations executed by the data recovery method.

A non-transitory computer-readable storage medium is provided. The non-transitory computer-readable storage medium stores instructions which when executed by at least one processor cause the at least one processor to perform the data recovery method.

Details of one or more embodiments of this application are provided in the accompanying drawings and descriptions below. Other features and advantages of this application become clearer from the specification, the accompanying drawings, and the claims.

DESCRIPTION OF EMBODIMENTS

Figure 1:
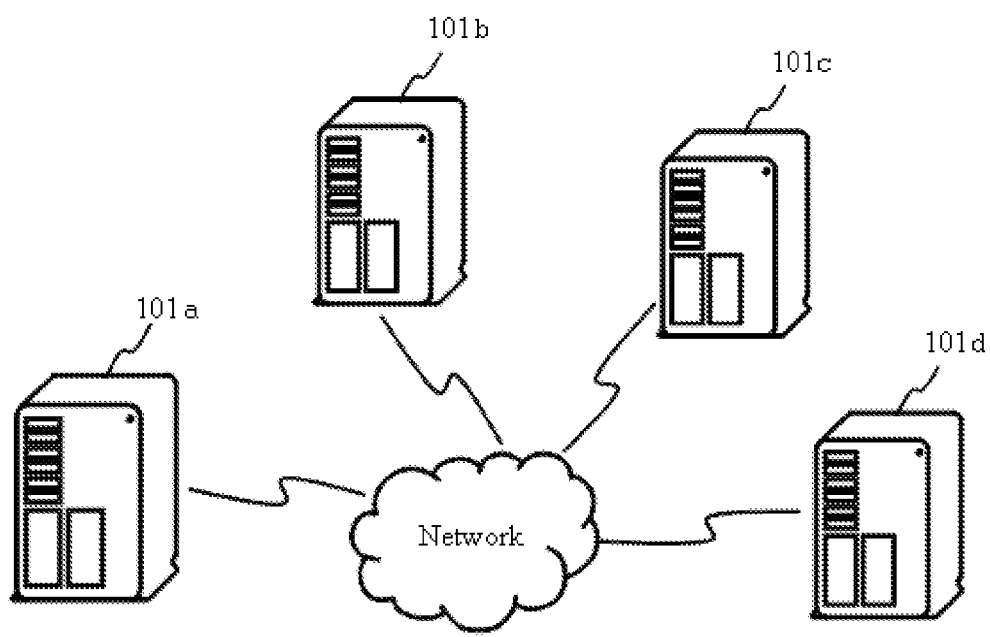
FIG. 1 is a schematic diagram of an implementation environment of a data recovery method according to an embodiment of this application.

To make the objectives, technical solutions, and advantages of this application clearer, the following further describes implementations of this application in detail with reference to the accompanying drawings.

A database involved in an embodiment of this application stores a plurality of data tables, each data table may be used for storing a data item, and the data item may have one or more versions. The database may be any type of database based on multi-version concurrency control (MVCC). In this embodiment of this application, the type of the database is not specifically limited. Data in the database may include three states based on a state attribute: a current state, a transition state, and a historical state. The three states are together referred to as "full state of data", or full-state data for short. Different state attributes in the full-state data may be used for identifying the state of the data in a life cycle trajectory of the data.

Current state: data of the latest version of a data item is data in a current stage. A state of data in the current stage is referred to as a current state.

Transition state: it is neither the latest version nor a historical state version of a data item, but is in the process of transition from the current state to the transition state, and data in the transition state is referred to as half-life data.

Historical state: a state of a data item in history, a value of data is an old value instead of a current value. A state of data in a history stage is referred to as a historical state. There may be a plurality of historical states of a data item, reflecting a state change process of the data. The data in the historical state can be read only, and is not allowed to be modified or deleted.

Under an MVCC mechanism, all the three states of data exist, but under a non-MVCC mechanism, only the historical state and the current state of data exist. A new value of the data after a transaction is submitted is in the current state under the MVCC or a blocked concurrent access control mechanism. The MVCC mechanism is used as an example, data generated by a transaction before a smallest transaction in a current active transaction list is in the historical state. Under the blocked concurrent access control mechanism, after the transaction is submitted, a value of data before submission becomes a value in the historical state, that is, an old value of a data item is in the historical state. There is still an active transaction (not a latest related transaction) on a read version in use, and because the latest related transaction modifies the value of the data item, a latest value of the data item is already in the current state, and a read value is already in the historical state relative to the current state. Therefore, a data state of the data item is between the current state and the historical state, and the data state is referred to as the transition state.

For example, under the MVCC mechanism, an account balance A in a User table is recharged from 10 yuan to 20 yuan, and then becomes 5 yuan after 15 yuan is spent. In this case, a financial institution B reading data and checking a transaction is in progress, A is then recharged by 20 yuan to 25 yuan, the 25 yuan is current-state data, the 5 yuan that B is reading is in the transition state, and the remaining two values 20 and 10 are in states that have existed in history, and are historical-state data.

Optionally, in this embodiment, the data recovery method may be applied to a hardware environment including a plurality of servers 101*a*-101*d* as shown in FIG. 1. As shown in FIG. 1, the plurality of servers 101*a*-101*d* are connected through a network, or the plurality of servers 101*a*-101*d* may be data-isolated. The network includes, but is not limited to, a wide area network, a metropolitan area network, or a local area network. The data recovery method in the embodiments of this application may be executed by any one of the servers 101*a*-101*d* or may be executed by a plurality of servers 101*a*-101*d*. A database system may run on one or more of the servers 101*a*-101*d*, to provide a data service such as data storage or data query. The database system may operate by using a database engine running on the server.

Figure 2:
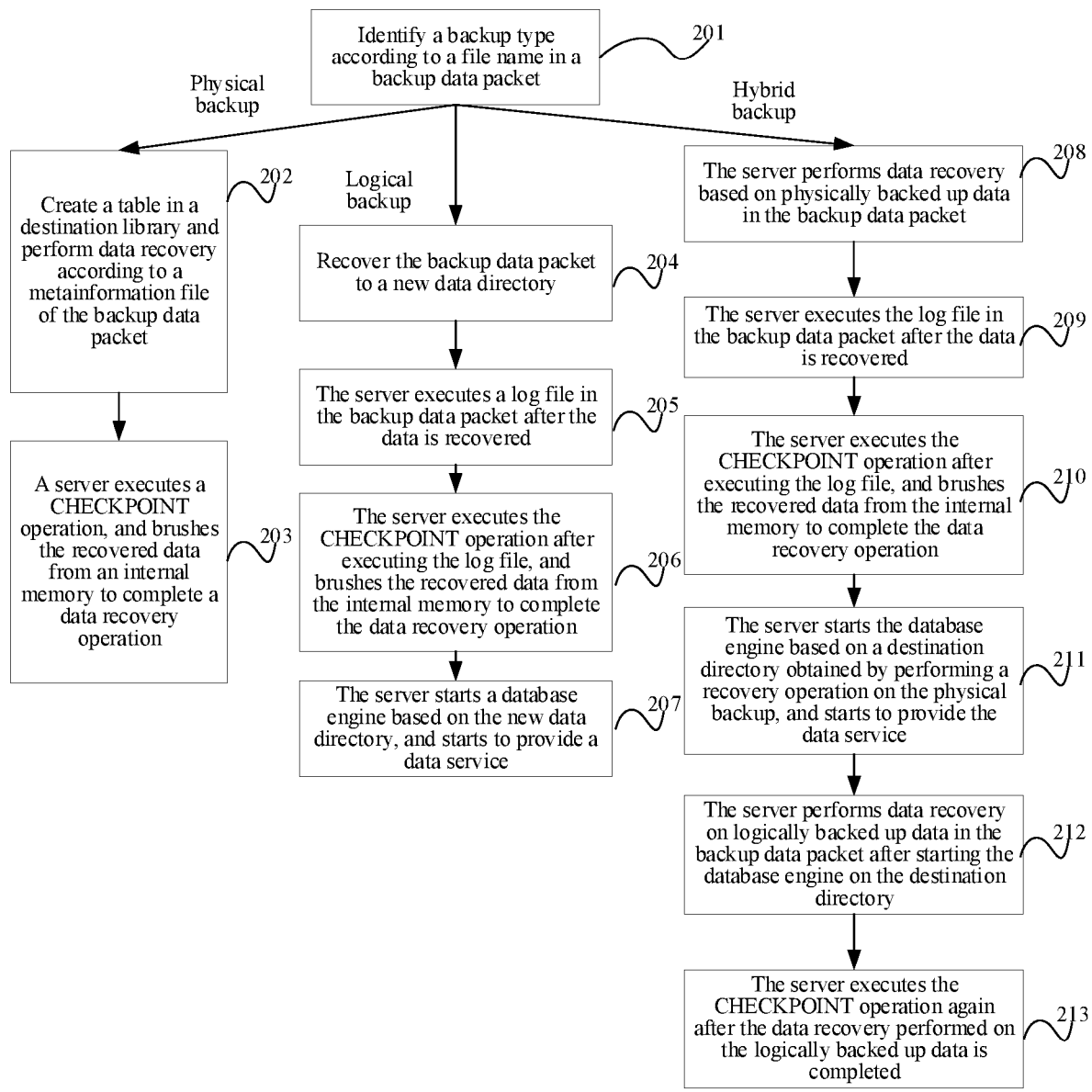
FIG. 2 is a flowchart of a data recovery method according to an embodiment of this application.

FIG. 2 is a flowchart of a data recovery method according to an embodiment of this application. Referring to FIG. 2, this embodiment can include the following steps.

In step 201, a backup type is identified according to a file name in a backup data packet.

Since file names of files in backup data packets generated by different backup types are different, a backup type of the backup data packet may be identified by using the file name in the backup data packet, and subsequently, corresponding data recovery processes may be performed according to different backup types based on the backup type. In another possible implementation, the backup type may also be identified by identifying a type identifier included in the backup data packet, that is, the corresponding backup type is obtained according to the type identifier carried in the backup data packet. The type identifier may be included in a specified file of the backup data packet, or may be carried in a packet name of the backup data packet. This is not specifically limited in this embodiment of this application. The type identifier may be a field such as a number or a character string used for indicating the backup type.

Type identification based on a file name is used as an example, for the backup data packet, data included in backup data packets obtained in backup processes of different backup types is different, file names are also different, and examples are as follows.

A backup data packet obtained by a physical backup only has current-state data, but no historical-state data or transition-state data. A file name of a file in the backup data packet obtained by the physical backup carries a field used for indicating the physical backup, for example, the file name may be PhMeta_00000001, PhData_00000001, Log_00000001, or the like.

A backup data packet obtained by a logical backup may include full-state data, that is, include the current-state data, the historical-state data, and the transition-state data. A file name of a file in the backup data packet obtained by the logical backup carries a field used for indicating the logical backup, for example, the file name may be LoMeta_00000001, LoData_00000001, HMeta_00000001, HData_00000001, or the like.

A hybrid backup, that is, a backup data packet obtained by mixing the logical backup and the physical backup, may also include the full-state data, that is, include the current-state data, the historical-state data, and the transition-state data. A file name of a file in the backup data packet obtained by the hybrid backup carries a field used for indicating the hybrid backup, for example, the file name may be Meta_00000001, Data_00000001, Log_00000001, HMeta_00000001, HData_00000001, or the like.

In step 202, a table in a destination library is created and data recovery is performed according to a meta information file of the backup data packet in a case that the identified backup type is a logical backup.

For the logical backup, data in the backup data packet may be a current-state time point value, a historical-state time point value, and a full-state time period value, which are obtained based on backup processes of different snapshots.

First, a backup data packet is obtained by performing the logical backup based on a routine transaction snapshot. For recovery of this type of backup, the recovery process may include: reading meta information of a table file from the meta information file of the backup data packet, creating the table in the destination library based on the meta information of the table file, indicating that the recovery fails, and then performing an insert operation (e.g., an INSERT operation) to perform data recovery in a case that a table of the same name exists in the destination library. Such data recovery only supports "running-state logical recovery".

Second, a backup data packet is obtained by performing the logical backup based on a historical transaction snapshot, and the backup data packet includes backup data in the historical state and the transition state. For recovery of this type of backup, the recovery process may include: reading meta information of a table file from the meta information file of the backup data packet; creating the table in the destination library based on the meta information of the table file, and then performing an insert operation (e.g., an INSERT operation) to perform data recovery in a case that no table of the same name exists in the destination library. If a table of the same name exists in the destination library, the table is not created, only data recovery is performed. In a possible implementation, if there is data identical to data to be recovered in the table of the same name in the destination library, it indicates that recovery fails, and if there is no data identical to the data to be recovered in the table of the same name in the destination library, recovery is performed based on the data to be recovered (e.g., enforcing recovery). Whether there is the data identical to the data to be recovered in the table of the same name in the destination library may be checked by using a primary key index. When there is a primary key index identical to the primary key index of the data to be recovered, it indicates that there is the data identical to the data to be recovered, and the recovery fails, and when there is no primary key index in the table of the same name in the destination library, the recovery is performed based on the data to be recovered. Such data recovery only supports "running-state logical recovery". Further, in some database systems with distinguishing permissions, the data recovery may be limited to being performed by a super user (a local user with a maximum permission).

Third, a backup data packet is obtained by performing the logical backup based on the historical transaction snapshot and the routine transaction snapshot, and the backup data packet includes backup data in the current state, the historical state and the transition state. For recovery of this type of backup, the recovery process may include the first recovery process and the second recovery process, that is, performing data recovery by combining the data recovery manners that correspond to the routine transaction snapshot and the historical transaction snapshot, and during data recovery, to improve recovery efficiency, the table of the same name only needs to be checked once without needing to repeat the check.

The performing data recovery by combining the data recovery manners that correspond to the routine transaction snapshot and the historical transaction snapshot can include: reading meta information of a table file from the meta information file of the backup data packet; creating the table in the destination library based on the meta information of the table file; and performing an insert operation on the table to perform data recovery on the logically backed up data in the backup data packet; or reading meta information of a table file from the meta information file of the backup data packet; creating the table in the destination library based on the meta information of the table file, and performing an insert operation to perform data recovery in a case that no table of the same name exists in the destination library; and performing an insert operation on the table of the same name to perform data recovery in a case that a table of the same name exists in the destination library.

In the above process, the creating a table is an optional step. In a recovery command, whether to create a table may be specified by using a parameter. For example, in a RECOVERY command, whether to create a table is specified by using a parameter "CREATE TABLE=Y/N", Y means create, and N means not create.

A backup data packet obtained by performing a pure logical backup may be recovered separately by using the technical process. However, a backup data packet of the hybrid backup may also include the logically backed up data. Recovery of this type of data is implicitly logical data recovery, and the recovery principle is the same as above.

Optionally, to improve efficiency of data recovery, data recovery may be performed on a plurality of tables in a multi-thread parallel manner. Specifically, files in the backup data packet are read by using a plurality of threads in parallel, and read recovery commands are executed in parallel. For example, data files such as LoData_00000001 and LoData_00000002, may be read in parallel, and an SQL command in each data file may be executed in parallel.

Optionally, to improve efficiency of data recovery, for the historical-state data, in the recovery process, the server may prohibit various consistency check operations of a transaction, but directly store the data in a data page of a historical table.

In an example, the recovery command of the logical backup may be an SQL statement, or may be a command of a CLI format. For example, the following commands may be adopted to recover data of a backup data packet '/usr/bak/my_first_backup_02' to '/data/my_data_02':

recovery of physical backup: RECOVERY FROM '/usr/bak/my_first_backup02' TO '/data/my_data_02';//, which uses a RECOVERY command of the CLI to recover to an empty directory recovery of logical backup: RECOVERY FROM '/usr/bak/my_first_backup_02'INCLUDE my_table01, my_table02;//, which recovers from a running system In step 203, a server executes a CHECKPOINT operation, and brushes the recovered data from an internal memory to complete a data recovery operation.

If a backup data packet is obtained in a pure logical manner, recovery may be allowed to perform during running of a database engine, which is referred to as "running-state logical recovery", that is, recovery of the logical backup may be performed during the running of the database engine. After the recovery is completed, there is no need to start the database engine again. Certainly, to improve a running speed, the database engine may also be restarted, that is, the server may restart a database system based on the destination library obtained by performing the recovery operation on the logical backup, to provide a data service. This is not limited in this embodiment of this application. Moreover, the physical backup is generally only performed when the database engine is in a non-running state, which is referred to as "non-running-state physical recovery". Backup data based on the hybrid manner may be recovered in a semi-offline condition when being in a running state. The semi-offline condition refers to that the physically backed up data is recovered in an offline state, the server is then started, and a log and the logically backed up data are then recovered.

In step 204, the backup data packet is recovered to a new data directory in a case that the identified backup type is a physical backup.

In an example, a recovery command of the physical backup may be a command of a CLI (command-line interface) format.

In step 205, the server executes a log file in the backup data packet after the data is recovered.

For the backed up current-state data, to ensure data consistency, the log file further needs to be backed up, that is, the data needs to be recovered based on the log file. In a possible implementation, a process of executing the log file may be that a recovery work is performed based on the log file (e.g., a REDO log) by using an ARIES algorithm principle, to achieve consistency of data at the moment of a backup point.

In step 206, the server executes the CHECKPOINT operation after executing the log file, and brushes the recovered data from the internal memory to complete the data recovery operation.

In step 207, the server starts a database engine based on the new data directory, starts to provide a data service, and ends.

For example, the recovery process in steps 204 to 207 includes the backup data packet is recovered to a blank data directory, and the server may start the database engine on the new data directory obtained by performing a recovery operation on the physical backup, and start to provide the data service.

In step 208, the server performs data recovery based on physically backed up data in the backup data packet in a case that the identified backup type is a hybrid backup.

Before starting the data recovery, the server checks whether the destination directory is empty, and if the destination directory is not empty, the server reports an error and exits. Optionally, for some database systems, the data recovery needs to be first performed based on a control file in the backup data packet, to recover the environment at the time of backup. For example, necessary data such as the control file may be recovered by using the ARIES algorithm principle.

The physically backed up data is recovered by using a file copy manner is adopted. Because the physically backed up data is backed up in a block copy manner, and an independent data file is formed after the backup, the physically backed up data may be directly recovered in the file copy manner. Specifically, the data recovery process based on file copy includes: copying the physically backed up data in the backup data packet to a location corresponding to a destination directory according to a file name and a table name in a file copy manner. For example, there is a data file in a subdirectory mydata in an original system, a corresponding subdirectory mydata needs to be created in the destination directory, and the corresponding data file is then copied to the subdirectory. A file name is named according to a Meta series, that is, a name in the original system during the backup. Therefore, data consistency may be guaranteed during recovery.

To improve efficiency of data recovery, the physically backed up data in the backup data packet is recovered in a parallel manner, and a plurality of data files are simultaneously copied to a location corresponding to the specified recovery destination directory. Since the physically backed up data forms an independent data file after the backup, data recovery may be directly performed in a parallel copy manner during recovery.

In step 209, the server executes the log file in the backup data packet after the data is recovered.

In step 210, the server executes the CHECKPOINT operation after executing the log file, and brushes the recovered data from the internal memory to complete the data recovery operation.

In step 211, the server starts the database engine based on a destination directory obtained by performing a recovery operation on the physical backup, and starts to provide the data service.

In the process of starting the database engine by the server, the server may prohibit the execution of a "system failure recovery" process.

For the process of recovering the physical backup in steps 208 to 211, reference may be made to the technical content described in the recovery of the physical backup involved in the foregoing embodiment, and details are not described herein again.

In step 212, the server performs data recovery on logically backed up data in the backup data packet after starting the database engine on the destination directory.

A logical recovery command is constructed after the data recovery based on the physically backed up data is completed, the logical recovery command is executed, and data recovery of the physically backed up data in the backup data packet is triggered. For example, and implicit logical recovery SQL statement RECOVERY may be constructed, which adopts the same principle as the recovery of the logical backup, and details are not described herein again.

The backup data packet may be a backup data packet formed by a plurality of tar packets. In this case, the plurality of tar packets may be first decompressed to the same temporary directory, and then data recovery is performed based on the temporary directory. In an implementation, the temporary directory is used as content of a recovery data source clause in the recovery command, for example, the temporary directory is used as content of a FROM clause in the RECOVERY command, and the RECOVERY command is executed to perform the data recovery.

In step 213, the server executes the CHECKPOINT operation again after the data recovery performed on the logically backed up data is completed.

The recovery of full data of the database system may generally be performed through offline recovery. Therefore, the recovery may be only performed by using a BACKUP command of the CLI. For the recovery of partial data, both offline recovery and online recovery are supported.

In addition, in some possible implementations, for operating systems of some database engines, there are permission differences between users. Therefore, a user permission for a recovery operation may be limited. For example, an executor of a recovery command necessarily has a permission to start the operating systems of the database engines. In some possible implementations, the database may also have a permission difference. To ensure the comprehensiveness of the recovered data, when the logical data is recovered, checking of the user permission is skipped, and the recovery operation is allowed.

Optionally, to ensure the consistency of the data, after the data recovery is performed, visibility of the data may also be determined, so as to determine which data may be read and displayed to the user. For example, if data is backed up in a block, in a page, some data is valid data (meeting a backup condition such as a WHERE condition specified during backup), and some data is invalid data (not meeting the backup condition specified during backup, but being redundantly backed up due to block backup) may not be read.

Based on the foregoing factors, correspondingly, during data recovery, a process of copying a data file is not simply a block copy, but may be processed in several situations:

1. There is no backup condition during backup (e.g., no WHERE condition during backup), then a backup object of the backup data packet is a full table space, and file copy and/or data block copy may be directly performed without additional operations.

2. There is a backup condition during backup (e.g., a WHERE condition during backup), then the backup condition is capable of covering all data files, and file copy and/or data block copy may be directly performed without additional operations.

Figure 3:
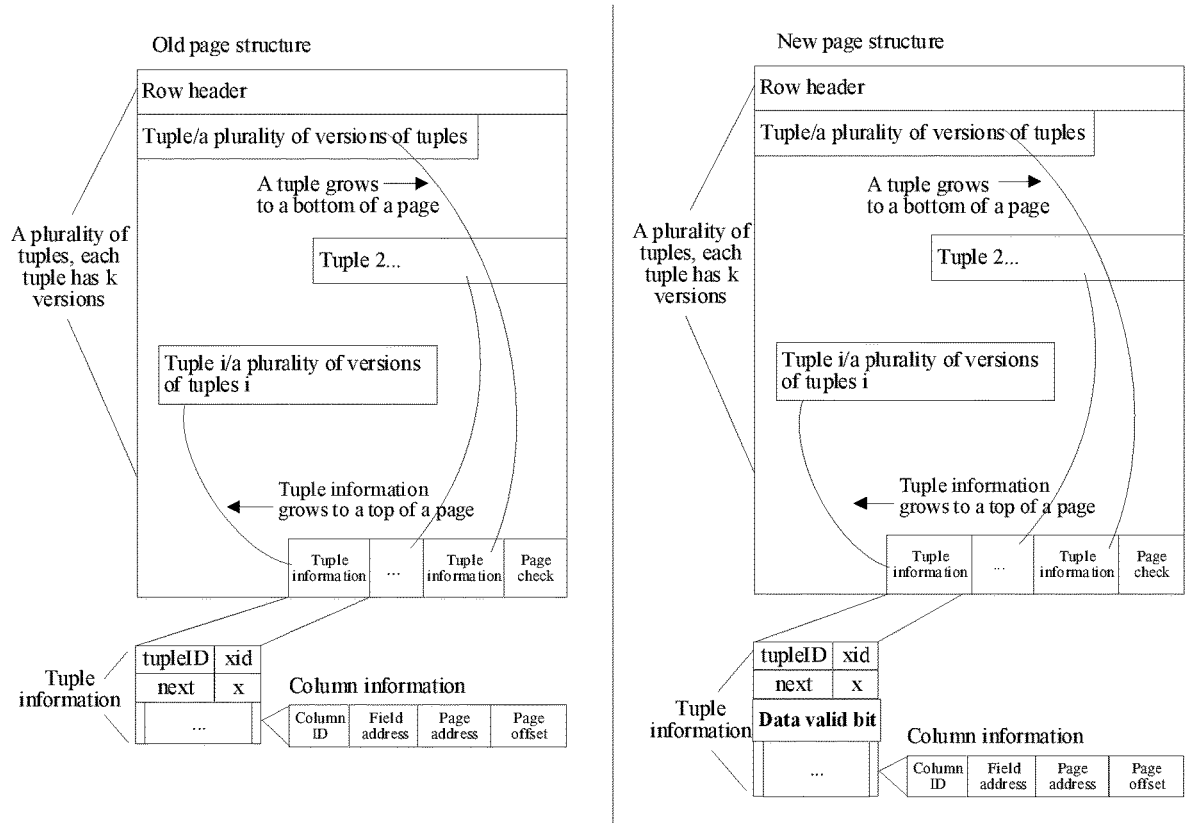
FIG. 3 is a page comparison diagram according to an embodiment of this application.

3. There is a backup condition during backup (e.g., a WHERE condition during backup), and the backup condition is not capable of covering all data files, and backup is performed by using file copy or block copy during backup, and the backup is shown in FIG. 3, a page spread flag is set. In this case, when data recovery is performed, each data block is identified and filtered according to the backup condition (the hybrid backup is used as an example, the WHERE condition may be stored in the meta information file, for example, in HMeta_00000001 file). When the data block does not meet the backup condition, a bit position that corresponds to each version and that is in a "data valid bit" is 1. After the data recovery is completed, when each version is read by a data reading operation, and if a data valid bit indicates that the version is invisible, the version is not returned; and if the data valid bit indicates that the version is visible, the version is returned. For example, if a bit value of a corresponding "data valid bit" is 1, the version is not returned; if a bit value of the corresponding "data valid bit" is not 1, the version may be returned, so that the version is visible to the user. Since there is no direct association relationship between data blocks, during data recovery, a block may be used as a unit, and data identification bits may be set in parallel to improve recovery efficiency. Generally, data backup may be based on the overall backup table, so that an efficiency problem caused by the identification and filtering process may be avoided during recovery.

After the data recovery is completed, in the process of reading the data, as shown in FIG. 3, a data valid bit is divided into two parts. In an implementation, the data valid bit may be represented by two bits: one part is a data identification bit, which is used for indicating whether the version is visible and may be represented by one bit, and the other part is a page spread flag, which is used for indicating whether data on this page is spread across pages, that is, the remaining bit, and 1 indicates page spread, and 0 indicates not page spread. When there is a page spread flag, it cannot stop when searching for data, and the next page is read for page analysis.

The embodiments of this application provide a recovery method based on temporal data backup on the basis of a temporal database, so that after data in any state in full state data is backed up, for example logical backup, physical backup, or hybrid backup, data recovery can be implemented, thereby ensuring effective storage and security reliability of temporal data and providing effective guarantee.

It is to be understood that, although the steps in the flowchart of FIG. 2 are displayed sequentially according to indication of arrows, these steps are not necessarily performed sequentially according to the sequence indicated by the arrows. Unless otherwise explicitly specified in this specification, execution of the steps is not strictly limited, and the steps may be performed in other sequences. In addition, at least some steps in FIG. 2 may include a plurality of substeps or a plurality of stages. The substeps or the stages are not necessarily performed at the same moment, but may be performed at different moments. The substeps or the stages are not necessarily performed in sequence, but may be performed in turn or alternately with another step or at least some of substeps or stages of the another step.

Figure 4:
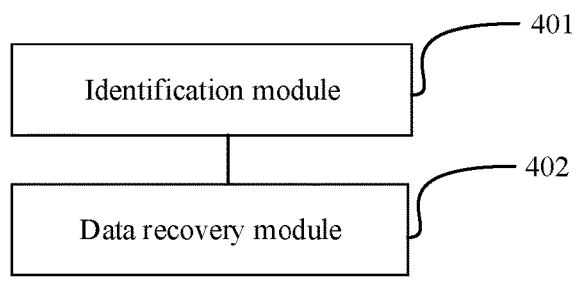
FIG. 4 is a schematic structural diagram of a data recovery apparatus according to an embodiment of this application.

FIG. 4 is a schematic structural diagram of a data recovery apparatus according to an embodiment of this application. Referring to FIG. 4, the apparatus includes one or more modules such as an identification module 401 and a data recovery module 402. One or more of the modules of the data recovery apparatus can be implemented by processing circuitry, software, or a combination thereof, for example.

The identification module 401 is configured to identify a backup type of a backup data packet. The data recovery module 402 is configured to perform data recovery based on physically backed up data in the backup data packet in a case that the identified backup type is a hybrid backup, the hybrid backup referring to a backup process including a physical backup and a logical backup. The data recovery module 402 is further configured to perform data recovery on logically backed up data in the backup data packet after the data recovery based on the physically backed up data is completed.

In a possible implementation, the data recovery module 402 is configured to copy the physically backed up data in the backup data packet to a location corresponding to a destination directory according to a file name and a table name in a file copy manner.

In a possible implementation, the physically backed up data in the backup data packet is copied in a parallel manner.

In a possible implementation, the apparatus further includes a trigger module. The trigger module is configured to construct a logical recovery command after the data recovery based on the physically backed up data is completed; and execute the logical recovery command, and trigger data recovery of the physically backed up data in the backup data packet.

In a possible implementation, the data recovery module 402 is further configured to create a table in a destination library and perform data recovery according to a meta information file of the backup data packet in a case that the identified backup type is a logical backup.

In a possible implementation, the data recovery module 402 is configured to read meta information of a table file from the meta information file of the backup data packet in a case that the backup data packet is obtained based on a routine transaction snapshot; create the table in the destination library based on the meta information of the table file; and perform an insert operation to perform data recovery; and indicate that recovery fails in a case that a table of the same name exists in the destination library.

In a possible implementation, the data recovery module 402 is further configured to read meta information of a table file from the meta information file of the backup data packet in a case that the backup data packet is obtained based on a historical transaction snapshot; create the table in the destination library based on the meta information of the table file, and perform an insert operation to perform data recovery in a case that no table of the same name exists in the destination library; and not create the table, and only perform data recovery in a case that a table of the same name exists in the destination library.

In a possible implementation, the data recovery module 402 is further configured to perform data recovery by combining data recovery manners that correspond to the routine transaction snapshot and the historical transaction snapshot in a case that the backup data packet is obtained based on the routine transaction snapshot and the historical transaction snapshot.

In a possible implementation, the data recovery module 402 is further configured to indicate that recovery fails in a case that there is data identical to data to be recovered in the table of the same name in the destination library; and, perform recovery based on the data to be recovered in a case that there is no data identical to the data to be recovered in the table of the same name in the destination library.

In a possible implementation, the data recovery module 402 is further configured to check whether there is data identical to the data to be recovered in the table of the same name in the destination library by using a primary key index.

In a possible implementation, the data recovery module 402 is further configured to perform data recovery based on the backup data packet and a newly created data directory in a case that the identified backup type is a physical backup.

In a possible implementation, the data recovery module 402 is further configured to perform data recovery based on the physically backed up data in the backup data packet in a multi-thread parallel manner.

In a possible implementation, the data recovery module 402 is further configured to perform data recovery based on the logically backed up data in the backup data packet in a multi-thread parallel manner.

In a possible implementation, the data recovery module 402 is further configured to perform file copy or block copy in a case that no backup condition is included during backup in the process of data recovery; and perform file copy or block copy in a case that a backup condition is included during backup and the backup condition is capable of covering all data files.

In a possible implementation, the data recovery module 402 is further configured to perform data recovery based on invalid data annotated in the meta information file in the backup data packet in a case that file copy or block copy is performed during backup, a backup condition is included during backup, and the backup condition is not capable of covering all data files in the process of data recovery.

In a possible implementation, the identification module 401 is configured to obtain a backup type corresponding to a file name according to the file name in the backup data packet; or obtain a backup type corresponding to a type identifier according to the type identifier carried by the backup data packet.

In a possible implementation, the apparatus further includes a reading module. The reading module is configured to after data recovery is completed, not return the version in a case that any version is read by a data reading operation, and a data valid bit of the version indicates that the version is invisible; and return the version in a case that the data valid bit of the version indicates that the version is visible.

When the data recovery apparatus provided in the embodiments performs data recovery, division of the foregoing functional modules above is merely used as an example for description. In an actual application, the foregoing functions may be assigned to and completed by different modules as needed, that is, the internal structure of the apparatus is divided into different functional modules to implement all or some of the functions described above. One or more of the modules or functions can be implemented by processing circuitry, software, or a combination thereof, for example. In addition, the data recovery apparatus provided in the foregoing embodiments shares the same concept with the embodiments of the data recovery method. For the specific implementation process, reference is made to the method embodiments. Details are not described herein again.

Figure 5:
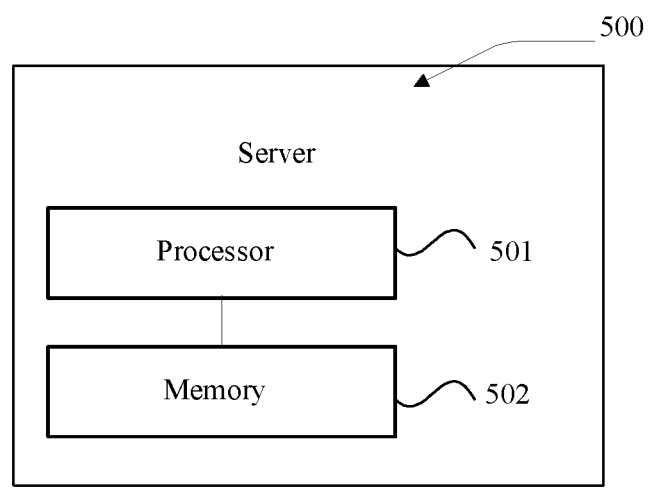
FIG. 5 is a schematic structural diagram of a server according to an embodiment of this application.

FIG. 5 is a schematic structural diagram of a server according to an embodiment of this application. The server 500 may vary greatly due to different configurations or performance, and may include processing circuitry such as one or more central processing units (CPUs) 501 and one or more memories 502. The memory 502 stores at least one instruction, the at least one instruction being loaded and executed by the processor 501 to implement the method provided in the foregoing method embodiments. The server 500 may further include components such as a wired or wireless network interface, a keyboard, and an input/output interface, to facilitate inputs/outputs. The server 500 may further include another component configured to implement functions of a device, and details are not described herein again.

An embodiment of this application further provides a computer-readable storage medium such as a non-transitory computer-readable storage medium, applied to a server. The computer-readable storage medium stores at least one instruction, at least one program, a code set or an instruction set, the instruction, the program, the code set or the instruction set being loaded and executed by a processor to implement the operations performed by the server in the data recovery method according to the foregoing embodiments.

Whether the version is visible involved in the embodiments of this application refers to whether the version can be read by a transaction at the time of the transaction snapshot corresponding to a backup task. For any version of any tuple in a data table, whether the version is visible is determined according to the transaction snapshot, the creation time, deletion time, and submission time of the version. Each time the server reads a tuple from the data table, life cycle information of the tuple may be read, that is, information such as the creation time, deletion time, and submission time of the version, and the visibility judgment based on the historical time is used as an example.

(I) When the version is generated by an insert operation, and when the creation time is before the start time of the historical time period, and the submission time is during the historical time period, it is determined that the version is visible; or, when the creation time and the submission time are during the historical time period, it is determined that the version is visible.

(II) When the version is generated by a delete operation, and when the deletion time is before the start time of the historical time period, and the submission time is during the historical time period, it is determined that the version is visible; or, when the deletion time and the submission time are during the historical time period, it is determined that the version is visible.

(III) When the version is generated by an update operation, and when the creation time is before the start time of the historical time period, and the submission time is during the historical time period, it is determined that the version is visible; or, when the creation time is after the start time of the historical time period, and the submission time is during the historical time period, it is determined that the version is visible.

A person of ordinary skill in the art may understand that all or some of the steps of the above embodiments may be implemented by a program instructing related hardware such as processing circuitry. The program may be stored in a computer-readable storage medium. The storage medium mentioned above may be a ROM, a magnetic disk, an optical disk, and so on.

The technical features in the foregoing embodiments may be combined in other manners. To make the description concise, not all possible combinations of the technical features in the foregoing embodiments are described. However, combinations of the technical features shall all be considered as falling within the scope described in this specification provided that the combinations of the technical features do not conflict with each other.

The foregoing embodiments only show several implementations of this application and are described in detail, but they are not to be construed as a limit to the patent scope of this application. A person of ordinary skill in the art may further make variations and improvements without departing from the ideas of this application, which all fall within the protection scope of this application. Therefore, the protection scope of this patent application is subject to the protection scope of the appended claims.

What is claimed is:

1. A data recovery method, the method comprising:
identifying a backup type of a backup data packet; and in response to the identified backup type being a hybrid backup including (i) physically backed up data including only current-state data and (ii) logically backed up data including the current-state data, historical-state data, and transition-state data,
  performing data recovery based on the physically backed up data in the backup data packet; and
  after the data recovery based on the physically backed up data is complete,
    starting at least one server such that a database engine is running on the at least one server based on the data recovered based on the physically backed up data, and
    performing, by processing circuitry, data recovery based on the logically backed up data in the backup data packet while the database engine is running.

2. The method according to claim 1, wherein the performing the data recovery based on the physically backed up data comprises:
  copying the physically backed up data in the backup data packet to a location corresponding to a destination directory according to a file name and a table name.

3. The method according to claim 1, further comprising:
  copying a plurality of data files in the physically backed up data in the backup data packet to a location corresponding to a destination directory in parallel.

4. The method according to claim 1, further comprising:
  constructing a logical recovery command after the data recovery based on the physically backed up data is complete; and
  executing the logical recovery command, and triggering the data recovery based on the physically backed up data in the backup data packet.

5. The method according to claim 1, further comprising:
  creating a table in a destination library and performing data recovery according to a meta information file of the backup data packet in response to the identified backup type being a logical backup.

6. The method according to claim 5, further comprising:
  reading meta information of a table file from the meta information file of the backup data packet when the backup data packet is obtained based on a routine transaction snapshot, wherein
  the creating the table includes creating the table in the destination library based on the meta information of the table file, and
  the performing the data recovery according to the meta information file includes performing an insert operation on the table to perform the data recovery based on the logically backed up data in the backup data packet.

7. The method according to claim 5, further comprising:
  reading meta information of a table file from the meta information file of the backup data packet when the backup data packet is obtained based on a historical transaction snapshot, wherein
  the creating the table includes creating the table in the destination library based on the meta information of the table file, and
  the performing the data recovery according to the meta information file includes performing an insert operation to perform the data recovery based on the logically backed up data in response to a determination that no table of a same name exists in the destination library; and
  performing an insert operation on a table of the same name to perform the data recovery based on the logically backed up data in response to a determination that the table of the same name exists in the destination library.

8. The method according to claim 5, further comprising:
  reading meta information of a table file from the meta information file of the backup data packet when the backup data packet is obtained based on a routine transaction snapshot and a historical transaction snapshot, wherein
  the creating the table includes creating the table in the destination library based on the meta information of the table file, and
  the performing the data recovery according to the meta information file includes performing an insert operation on the table to perform the data recovery based on the logically backed up data in the backup data packet.

9. The method according to claim 5, further comprising:
  reading meta information of a table file from the meta information file of the backup data packet, wherein
  the creating the table includes creating the table in the destination library based on the meta information of the table file, and
  the performing the data recovery according to the meta information file includes performing an insert operation to perform the data recovery based on the logically backed up data in response to a determination that no table of a same name exists in the destination library; and
  performing an insert operation on a table of the same name to perform the data recovery based on the logically backed up data in response to a determination that the table of the same name exists in the destination library.

10. The method according to claim 7, wherein the performing the insert operation on the table of the same name comprises:
  performing the data recovery based on the logically backed up data and based on data to be recovered in response to a determination that there is no data identical to the data to be recovered in the table of the same name in the destination library.

11. The method according to claim 1, further comprising:
  performing data recovery based on the backup data packet and a newly created data directory in response to the identified backup type being a physical backup.

12. The method according to claim 1, wherein the performing the data recovery based on the physically backed up data comprises:
  performing the data recovery based on the physically backed up data in the backup data packet in a multi-thread parallel manner.

13. The method according to claim 1, wherein the performing the data recovery based on the logically backed up data comprises:
  performing the data recovery based on the logically backed up data in the backup data packet in a multi-thread parallel manner.

14. The method according to claim 1, further comprising:
  performing file copy or block copy when no backup condition is specified during backup; and
  performing file copy or block copy when a backup condition is specified during backup and the backup condition is capable of covering all data files.

15. The method according to claim 1, further comprising:
  performing data recovery based on invalid data annotated in a meta information file in the backup data packet when file copy or block copy is performed during backup, a backup condition is specified during backup, and the backup condition is not capable of covering all data files.

16. The method according to claim 1, further comprising:
after the data recovery based on the logically backed up data is completed, not returning a version when the version is read by a data reading operation, and a data valid bit of the version indicates that the version is invisible; and
returning the version when the data valid bit of the version indicates that the version is visible.

17. A data recovery apparatus, comprising:
processing circuitry configured to:
identify a backup type of a backup data packet; and
in response to the identified backup type being a hybrid backup including (i) physically backed up data including only current-state data and (ii) logically backed up data including the current-state data, historical-state data, and transition-state data,
perform data recovery based on the physically backed up data in the backup data packet; and
after the data recovery based on the physically backed up data is complete,
start at least one server such that a database engine is running on the at least one server based on the data recovered based on the physically backed up data, and
perform data recovery based on the logically backed up data in the backup data packet while the database engine is running.

18. The data recovery apparatus according to claim 17, wherein the processing circuitry is configured to:
copy the physically backed up data in the backup data packet to a location corresponding to a destination directory according to a file name and a table name.

19. A non-transitory computer-readable storage medium storing instructions which, when executed by at least one processor, cause the at least one processor to perform:
identifying a backup type of a backup data packet; and
in response to the identified backup type being a hybrid backup including (i) physically backed up data including only current-state data and (ii) logically backed up data including the current-state data, historical-state data, and transition-state data,
performing data recovery based on the physically backed up data in the backup data packet; and
after the data recovery based on the physically backed up data is complete,
starting at least one server such that a database engine is running on the at least one server based on the data recovered based on the physically backed up data, and
performing data recovery based on the logically backed up data in the backup data packet while the database engine is running.

20. The non-transitory computer-readable storage medium according to claim 19, wherein the instructions further cause the at least one processor to perform:
copying the physically backed up data in the backup data packet to a location corresponding to a destination directory according to a file name and a table name.

* * * * *